March 8, 1927.
S. A. NEIDICH
1,620,279
RIBBON SPOOL CLUTCH
Filed July 28, 1925
FIG. I.
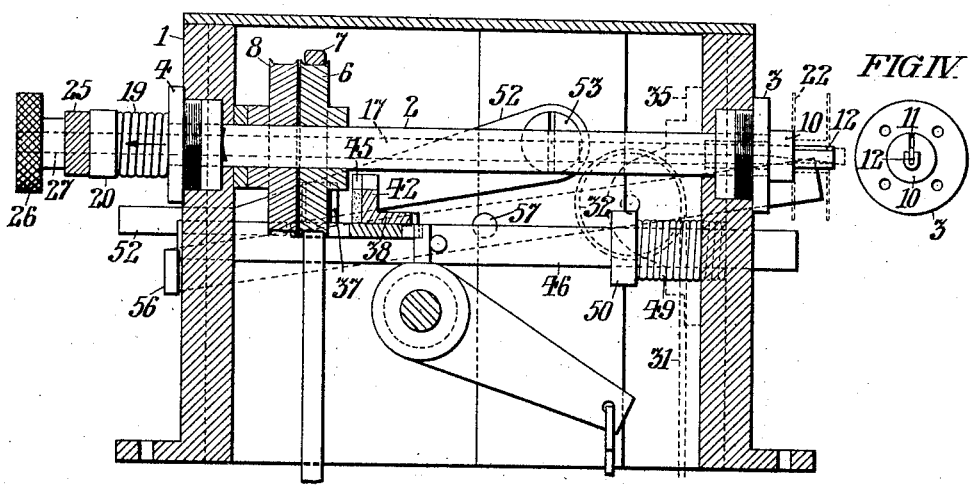
FIG. II.
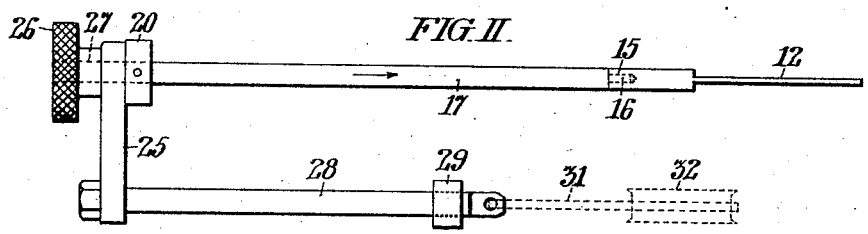
FIG. III.
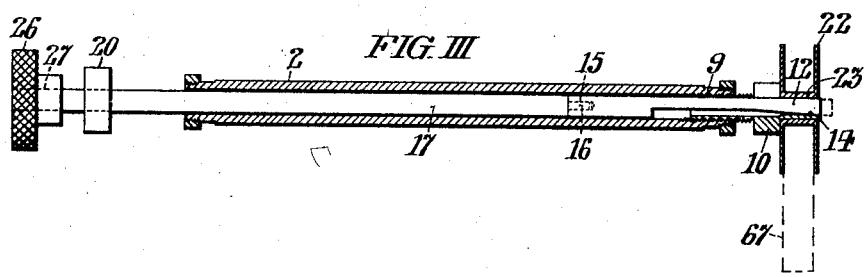
INVENTOR:
SAMUEL A. NEIDICH, Patented Mar. 8, 1927.

1,620,279

UNITED STATES PATENT OFFICE.

SAMUEL A. NEIDICH, OF EDGEWATER PARK, NEW JERSEY.

RIBBON-SPOOL CLUTCH.

Application filed July 28, 1925. Serial No. 46,580.

My invention relates to mechanism which may be advantageously employed in winding ink ribbons upon metal spools adapted for detachable connection with typewriting, billing, adding, and similar machines. Each such spool has an axial bearing hole which is smoothly cylindrical, and the object and effect of my invention is to provide a winding shaft with means adapted to extend in such a bearing hole and temporarily rigidly connect such a spool with the winding shaft by mere frictional engagement with the circumferential wall of such hole; but adapted to permit the operator to instantly release the spool from the winding mechanism when desired.

The winding mechanism herein described is the subject matter of my copending application Serial No. 46,823, filed July 29, 1925. My invention herein claimed comprises the various novel features of construction and arrangement hereinafter more definitely specified.

In said drawings: Fig. I is a transverse sectional view of the specific form of winding mechanism illustrated in my copending application aforesaid; section being taken through the frame of the mechanism on the vertical diametrical plane intersecting the axis of the winding shaft, but showing said shaft and its appurtenances in elevation.

Fig. II is a plan view of the clutch blade member and the mechanism whereby it may be reciprocated in said winding shaft.

Fig. III is a longitudinal vertical sectional view of said winding shaft, on the plane of section of Fig. I; but showing the clutch blade and its actuating rod in elevation.

Fig. IV is an elevation of the right hand end of said clutch mechanism, as indicated in Fig. I.

In said figures; 1 is the base frame of the winding mechanism in which the winding shaft 2 is journaled, preferably in ball bearings 3 and 4. Said winding shaft 2 has the pulley 6 rigidly connected therewith, whereby it may be rotated by the belt 7 which is arranged to be shifted on to the loose pulley 8, automatically, as hereinafter described.

Said winding shaft 2 is hollow and provided with the screw thread 9 at the front end thereof in which is detachably fitted the spool clutch sheath member 10, best shown in Fig. III. Said clutch member 10 has the longitudinal radial slot or groove 11, best shown in Fig. IV, in which the clutch blade member 12 is mounted, to reciprocate longitudinally and radially. As best shown in Fig. III; said clutch member 12 has the cam incline 14 at the lower front edge thereof, which rides over the front edge of the groove in said clutch member 10. Said clutch member 12 has the screw threaded socket 15 at its rear end, for engagement with the screw threaded front end 16 of the clutch rod 17, by which said blade 12 may be shifted longitudinally in its sheath 10. Said rod 17 is normally stressed in the direction of the arrow indicated in Fig. I, by the spring 19 which abuts at one end against the case of the ball bearing 4 and at the other end against the collar 20 which is rigidly connected with said rod 17. It may be observed that movement of said clutch rod 17 in that direction thrusts said clutch blade 12 radially outward to rigidly clamp the ribbon spool 22 in connection with said winding shaft 2, by frictional engagement with the inner cylindrical axial bearing surface of the hub 23 of said spool.

However, said spool 22 may be instantly released from said clutch, by movement of said clutch rod 17 in the direction of the arrow marked thereon in Fig. II, and such movement is effected by means of the yoke 25 which embraces said rod 17 between said collar 20 and the knob 26 which is internally screw threaded as a nut in engagement with the thread 27 on the rear end of said rod 17. As indicated in Fig. II; said yoke 25 is rigidly connected at its other end to the chain bar 28 which is mounted to reciprocate in said base frame 1 and the bracket 29 which is rigidly connected with said frame. Said chain bar 28 is connected at its front end with the chain 31 which extends over the sheave 32 to a pedal by which it may be operated. Said sheave 32 is journaled in the bracket 35 which is rigidly connected with said frame 1. It is to be understood that downward movement of said chain 31 thrusts said clutch rod 17 forward, to the right in Fig. I, so that said clutch blade 12 rides over the front edge of the groove 11 in said clutch sheath member 10, on its incline 14, and is thus permitted to radially retract from engagement with said spool 22; the connection of said blade 12 with said rod 17 tending to spring press said blade 12 in said groove 11, toward such retracted position, which is indicated in dotted lines in Figs. I and III.

As set forth at length in my copending application aforesaid; I provide means to automatically stop the rotation of said winding shaft 2, including the belt shifting fork 37 which is rigidly connected with the belt shifting lever 38. Said lever 38 carries the brake shoe bracket 42 which is pivotally connected therewith and faced with the brake shoe 45 which may be formed of suitable material to frictionally engage the adjacent face of said pulley 6 when said lever 38 is swung to the left in Fig. I. Such movement is conveniently effected by the spring bolt 46 which is mounted to reciprocate in the opposite sides of said base frame 1, as indicated in Fig. I, and pivotally connected with said lever 38. Said bolt 46 is encircled by the spring 49 which abuts at one end against said frame 1 and at the other end against the collar 50 which is rigidly connected with said bolt 46. Said spring 49 continually tends to thrust said spring bolt 46 to the left in Fig. I, but is normally held by said belt shifting lever 38, in inoperative position shown in Fig. I, in which said parts are detained by the detent latch lever 52 which is fulcrumed on the screw stud 53 projecting from said frame 1. Said latch 52 is arranged to overhang and engage the left hand edge of said lever 38, when said latch is permitted to drop, of its own weight, to the position shown in Fig. I. However, when said latch lever 52 is uplifted, to release said belt shifting lever 38; said spring 49 is permitted to act, to thrust said belt shifting lever 38 to the left in Fig. I to shift said belt 7 from said tight pulley 6 to said loose pulley 8 on said winding shaft 2 so as to stop the positive rotation of the latter. However, such movement of said lever 38 presents the brake shoe 45 in contact with said pulley 6 to check and stop the rotation of said shaft 2 after said belt 7 has been shifted.

Said detent latch 52 may be released as above described, by means of the manual trip lever 56 which is fulcrumed on the screw stud 57 projecting from the outside of said frame 1 and has its rear L-end extending below the end of said lever 52 which projects from said base frame.

The ink ribbon 67 is primarily wound in a large roll, on which it is directed, by suitable guides, to said spool 22, to which its front end is connected in any convenient manner so that the ribbon is wound on said spool by the rotation of said shaft 2.

Although I have found it convenient to embody my invention in the specific form of winding mechanism above described; I do not desire to limit myself to the precise details of construction and arrangement herein set forth as it is obvious that various modifications may be made therein without departing from the essential features of my invention as defined in the appended claims.

I claim:

1. In ribbon spool clutch mechanism; the combination with a tubular winding shaft, having an internal screw thread, at one end; of a clutch sheath member having an external screw thread, at one end, detachably fitted in said shaft thread, and having a longitudinal groove for a clutch blade; a clutch blade fitted for longitudinal and radial reciprocation in said groove, and having a cam incline at its inner edge arranged to ride in the bottom of said groove, over the front end of the latter, and having an internally screw threaded socket, in its rear end; a clutch rod mounted to reciprocate in said winding shaft, and having a screw thread, at its front end, arranged to fit said socket, and a screw thread at its rear end, provided with a removable knob; a collar on said rod, in spaced relation with said knob; a spring on said rod, arranged to operate said clutch; a yoke fitted on said rod between said knob and collar; a chain bar rigidly connected with said yoke, parallel with said rod, and mounted to reciprocate in said frame, with said clutch rod; and a chain operatively connected with said chain bar, to release said clutch; whereby said clutch may be operated to detachably rigidly engage the cylindrical wall of an axial opening in a ribbon spool, and thus detachably operatively connect such spool with said winding shaft.

2. In ribbon spool clutch mechanism; the combination with a tubular winding shaft, having a screw thread, at one end; of a clutch sheath member having a screw thread, at one end, detachably fitted to said shaft thread, and having a longitudinal groove for a clutch blade; a clutch blade fitted for longitudinal and radial reciprocation in said groove, and having a cam incline at its inner edge arranged to ride in the bottom of said groove, over the front end of the latter, and having a screw thread at its rear end; a clutch rod mounted to reciprocate in said winding shaft, and having a screw thread, at its front end, arranged to fit said blade thread; a spring arranged to operate said clutch; a yoke fitted on said rod; a bar rigidly connected with said yoke, parallel with said rod, and mounted to reciprocate with said clutch rod; and a flexible connector attached to said bar; whereby said clutch may be operated to detachably rigidly engage in an axial opening in a ribbon spool, and thus detachably operatively connect such spool with said winding shaft.

3. In ribbon spool clutch mechanism; the combination with tubular winding shaft, having a clutch sheath member, at one end, with a longitudinal groove for a clutch blade; a clutch blade fitted for longitudinal and radial reciprocation in said groove, and having a cam incline at its inner edge arranged to ride in the bottom of said groove, over the front end of the latter; a clutch rod mounted to reciprocate in said winding shaft, and connected with said blade; a spring arranged to operate said clutch; and means operatively connected with said rod, arranged to release said clutch; whereby said clutch may be operated to detachably rigidly engage the cylindrical wall of an axial opening in a ribbon spool, and thus detachably operatively connect such spool with said winding shaft.

4. In ribbon spool clutch mechanism; the combination with a tubular winding shaft having a sheath member, with a radial blade slot, at one end; a clutch blade fitted for reciprocation in said sheath member and having a cam incline in cooperative relation therewith arranged to radially project said blade in said blade slot; a clutch rod extending in said winding shaft and connected with said blade; a spring normally tending to relatively move said clutch members to engage said blade with a spool; and means operatively connected with said rod, arranged to release said clutch.

5. In ribbon spool clutch mechanism; the combination with a tubular winding shaft having a sheath member, with a radial blade slot, at one end; a clutch blade fitted for reciprocation in said sheath member and having a cam incline in cooperative relation therewith arranged to radially project said blade in said blade slot; a clutch rod extending in said winding shaft and connected with said blade; and having means operatively connected with said rod, arranged to operate said clutch.

In testimony whereof, I have hereunto signed my name at Burlington, New Jersey, this twenty-first day of July, 1925.

SAMUEL A. NEIDICH.